United States Patent
Chandra et al.

(10) Patent No.: US 11,163,561 B2
(45) Date of Patent: Nov. 2, 2021

(54) MAPPING COMPONENTS OF A NON-DISTRIBUTED ENVIRONMENT TO A DISTRIBUTED ENVIRONMENT

(71) Applicant: INTERNATIONAL BUSINESS MACHINES CORPORATION, Armonk, NY (US)

(72) Inventors: Rachita Chandra, Cambridge, MA (US); Italo Buleje, Orlando, FL (US); Gigi Y. C. Yuen-Reed, Tampa, FL (US); Shilpa N. Mahatma, Chappaqua, NY (US); Kevin N. Tran, Marina del Rey, CA (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 16/878,707

(22) Filed: May 20, 2020

(65) Prior Publication Data
US 2020/0278863 A1    Sep. 3, 2020

Related U.S. Application Data

(63) Continuation of application No. 15/957,962, filed on Apr. 20, 2018, now Pat. No. 10,705,836.

(51) Int. Cl.
*G06F 9/44* (2018.01)
*G06F 8/76* (2018.01)

(52) U.S. Cl.
CPC ................................... *G06F 8/76* (2013.01)

(58) Field of Classification Search
CPC ............................................... G06F 9/44
See application file for complete search history.

(56) References Cited

U.S. PATENT DOCUMENTS

| | | | | |
|---|---|---|---|---|
| 5,675,805 A | * | 10/1997 | Boldo | G06F 8/30 717/114 |
| 6,326,973 B1 | * | 12/2001 | Behrbaum | G06F 12/0284 345/520 |
| 7,127,701 B2 | * | 10/2006 | Fables | G06F 9/485 717/104 |
| 9,557,792 B1 | | 1/2017 | Potlapally | |

(Continued)

OTHER PUBLICATIONS

IBM: List of IBM Patents or Patent Applications Treated as Related (Appendix P), May 21, 2020, 2 pages.

(Continued)

*Primary Examiner* — Jae U Jeon
(74) *Attorney, Agent, or Firm* — Kenneth Han

(57) ABSTRACT

Embodiments of the present invention disclose a method, a computer program product, and a computer system for mapping components of non-distributed environments to distributed environments. A computer receives a data pipeline configured for a non-distributed environment and identifies one or more bottleneck components of the data pipeline. In addition, the computer converts data used in the pipeline to a format compatible with a distributed environment and installs the necessary computing libraries necessary for operating the pipeline within the distributed environment. The computer further converts the code of the pipeline to a code that is compatible with the distributed environment and optimizes components of the pipeline for use in the distributed environment.

20 Claims, 6 Drawing Sheets

(56) References Cited

U.S. PATENT DOCUMENTS

| | | |
|---|---|---|
| 9,983,670 B2 | 5/2018 | Coleman |
| 2005/0050187 A1 | 3/2005 | Freimuth |
| 2008/0134158 A1 | 6/2008 | Salz |
| 2012/0047239 A1 | 2/2012 | Donahue |
| 2013/0308457 A1 | 11/2013 | Luo |
| 2014/0149591 A1 | 5/2014 | Bhattacharya |
| 2014/0282456 A1 | 9/2014 | Drost |
| 2015/0143367 A1 | 5/2015 | Jia |
| 2015/0220371 A1 | 8/2015 | Yang |
| 2015/0347541 A1 | 12/2015 | Holmes |
| 2016/0048380 A1 | 2/2016 | Nakashima |
| 2019/0324745 A1 | 10/2019 | Chandra |

OTHER PUBLICATIONS

Low et al., "Distributed GraphLab: A Framework for Machine Learning and Data Mining in the Cloud," Proceedings of the VLDB Endowment, vol. 5, No. 8, Aug. 27-31, 2012, Istanbul, Turkey, Copyright 2012 VLDB Endowment, pp. 716-727.

Mell et al., "The NIST Definition of Cloud Computing", National Institute of Standards and Technology, Special Publication 800-145, Sep. 2011, pp. 1-7.

PDL, "Tekturna; (aliskiren) tablets 150mg-300mg," https://www.pdl.com/, Printed on Oct. 12, 2017, pp. 1-4.

\* cited by examiner

MAPPING COMPONENTS OF A NON-DISTRIBUTED ENVIRONMENT TO A DISTRIBUTED ENVIRONMENT

BACKGROUND

The present invention relates generally to data analytics, and more particularly to mapping components of a non-distributed environment to a distributed environment.

In general, scaling a technological solution beyond a certain point requires the adoption of an environment with multiple machines because a single machine does not have the computational resources to process increasing amounts of data. Most existing solutions typically start off directly with utilization of a pure non-distributed environment or a pure distributed environment, but few tackle the process of creating a framework for converting legacy components of a non-distributed environment to components of a distributed environment.

SUMMARY

Embodiments of the present invention disclose a method, a computer program product, and a computer system for mapping components of data pipeline from a non-distributed network to a distributed network.

According to an embodiment, the method comprises a computer identifying at least one bottleneck component of one or more components comprising the data pipeline when implemented within the non-distributed computing environment, and the computer converting data corresponding to the at least one bottleneck component from a format compatible with the non-distributed computing environment to a format compatible with the distributed computing environment. In addition, the method comprises the computer installing libraries corresponding to an architecture of the distributed computing environment, as well as the computer converting code of the at least one bottleneck component from a format compatible with the non-distributed computing environment to a format compatible with the distributed computing environment.

In embodiments, the method further comprises the computer measuring a performance of the at least one bottleneck component when implemented within the distributed computing environment.

Moreover, in some embodiments, the method of identifying the at least one bottleneck component further comprises at least one of the computer identifying at least one component of the one or more components having a greatest memory usage, and the computer identifying at least one component of the one or more components having a memory usage exceeding a threshold value.

In further embodiments, the method of identifying the at least one bottleneck component further comprises at least one of the computer identifying at least one component of the one or more components taking a longest time to complete a task, and the computer identifying at least one component of the one or more components taking longer than a threshold time to complete a task.

In yet further embodiments, the method may include the computer generating a model for operating the data pipeline having one or more parameters and one or more constraints, wherein the one or more parameters include memory usage and time. The method may further comprise the computer determining a lowest memory usage and shortest time based on the model, and the computer identifying at least one component of the one or more components that fails to perform at the lowest memory usage or the shortest time.

In still yet further embodiments, determining the at least one bottleneck component in future iterations is based on the measured performance of the at least one bottleneck component.

In some embodiments, converting code of the at least one bottleneck further comprises the computer determining that code of the at least one bottleneck component is incompatible with code of the non-distributed computing environment, and the computer generating a wrapper function enabling compatibility between code of the at least one bottleneck component and code of the non-distributed computing environment.

According to embodiments, a computer program product is provided. The computer program product comprises program instructions to identify at least one bottleneck component of one or more components comprising the data pipeline when implemented within the non-distributed computing environment, and program instructions to convert data corresponding to the at least one bottleneck component from a format compatible with the non-distributed computing environment to a format compatible with the distributed computing environment. In addition, the computer program product may also comprise program instructions to install libraries corresponding to an architecture of the distributed computing environment, and program instructions to convert code of the at least one bottleneck component from a format compatible with the non-distributed computing environment to a format compatible with the distributed computing environment.

In embodiments, the computer program product may further comprise program instructions to measure a performance of the at least one bottleneck component when implemented within the distributed computing environment.

Moreover, in some embodiments, program instructions to identify the at least one bottleneck component further comprise at least one of program instructions to identify at least one component of the one or more components having a greatest memory usage, and program instructions to identify at least one component of the one or more components having a memory usage exceeding a threshold value.

In further embodiments, program instructions to identify the at least one bottleneck component further comprise at least one of program instructions to identify at least one component of the one or more components taking a longest time to complete a task, and program instructions to identify at least one component of the one or more components taking longer than a threshold time to complete a task.

In yet further embodiments, program instructions to identify the at least one bottleneck component further comprise program instructions to generate a model for operating the data pipeline having one or more parameters and one or more constraints, wherein the one or more parameters include memory usage and time. In addition, the computer program product may further include program instructions to determine a lowest memory usage and shortest time based on the model, and program instructions to identify at least one component of the one or more components that fails to perform at the lowest memory usage or the shortest time.

In still yet further embodiments, program instructions to determine the at least one bottleneck component in future iterations is based on the measured performance of the at least one bottleneck component.

In some embodiments, program instructions to convert code of the at least one bottleneck further comprise program instructions to determine that code of the at least one bottleneck component is incompatible with code of the non-distributed computing environment, and program instructions to generate a wrapper function enabling compatibility between code of the at least one bottleneck component and code of the non-distributed computing environment.

According to some embodiments, a computer system is provided. The computer system comprises program instructions to identify at least one bottleneck component of one or more components comprising the data pipeline when implemented within the non-distributed computing environment, and program instructions to convert data corresponding to the at least one bottleneck component from a format compatible with the non-distributed computing environment to a format compatible with the distributed computing environment. In addition, the computer system may further comprise program instructions to install libraries corresponding to an architecture of the distributed computing environment, and program instructions to convert code of the at least one bottleneck component from a format compatible with the non-distributed computing environment to a format compatible with the distributed computing environment.

In embodiments, the computer system may further comprise program instructions to measure a performance of the at least one bottleneck component when implemented within the distributed computing environment.

Moreover, in some embodiments, program instructions to identify the at least one bottleneck component further comprise at least one of program instructions to identify at least one component of the one or more components having a greatest memory usage, and program instructions to identify at least one component of the one or more components having a memory usage exceeding a threshold value.

In further embodiments, program instructions to identify the at least one bottleneck component further comprise at least one of program instructions to identify at least one component of the one or more components taking a longest time to complete a task, and program instructions to identify at least one component of the one or more components taking longer than a threshold time to complete a task.

In yet further embodiments, program instructions to identify the at least one bottleneck component further comprise program instructions to generate a model for operating the data pipeline having one or more parameters and one or more constraints, wherein the one or more parameters include memory usage and time. In addition, the computer system may further provide program instructions to determine a lowest memory usage and shortest time based on the model, and program instructions to identify at least one component of the one or more components that fails to perform at the lowest memory usage or the shortest time.

In still yet further embodiments, program instructions to determine the at least one bottleneck component in future iterations is based on the measured performance of the at least one bottleneck component.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
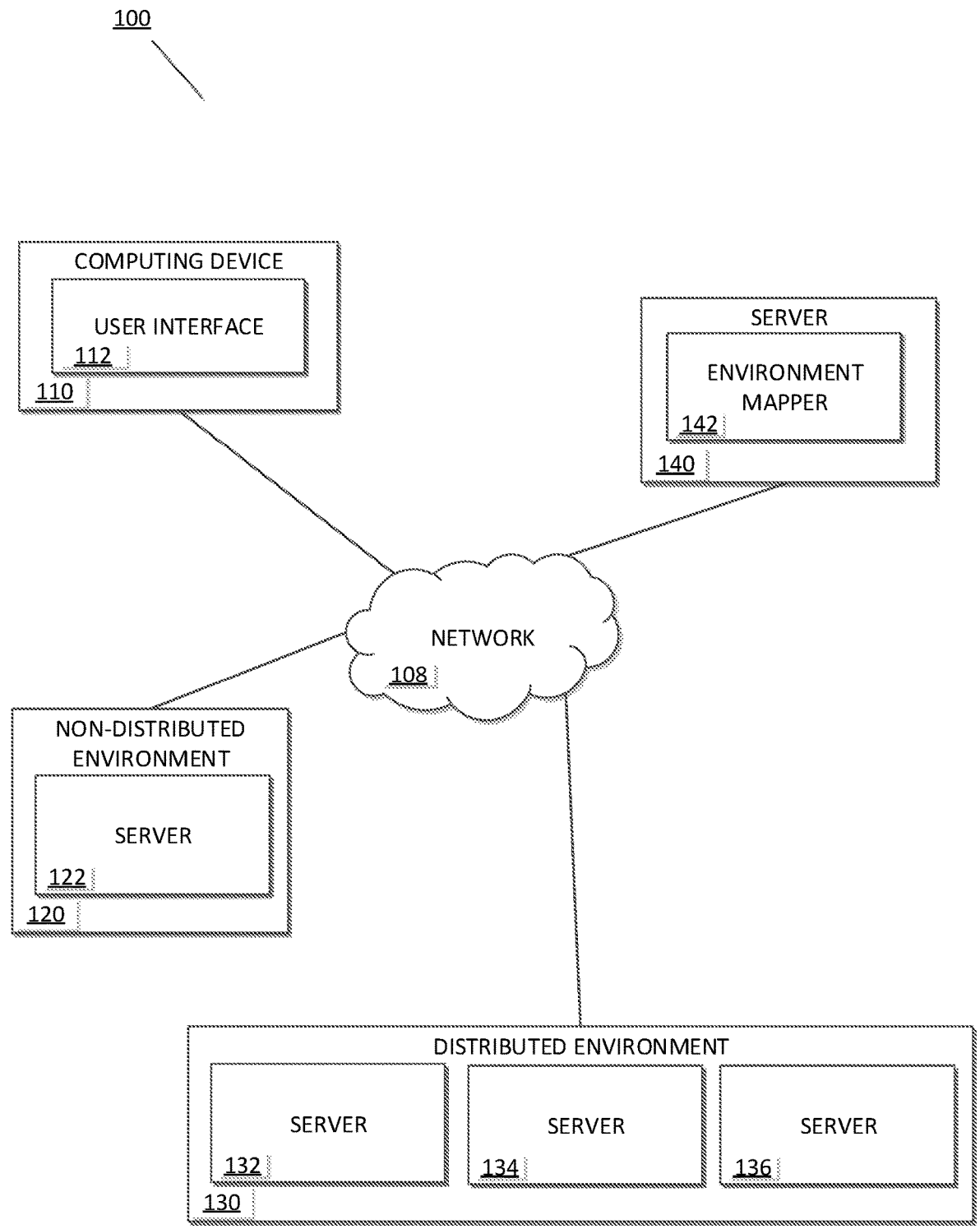
FIG. 1 depicts a schematic diagram of an environment mapping system 100, in accordance with an embodiment of the present invention.

Detailed embodiments of the claimed methods, computer program products, and computer systems are disclosed herein; however, it can be understood that the disclosed embodiments are merely illustrative of the claimed methods, computer program products, and computer systems that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

As data collection increases, the performance of particular components in a non-distributed pipeline may decrease due to, for example, an inability of the non-distributed environment to handle large amounts of data or complex computations thereof. In many cases, it is more cost effective to purchase additional, average-powered computing devices rather than purchase a single, high-powered computing device. For that reason, it may be more efficient, in terms of both cost and computing power, to translate components of a pipeline that were originally configured for a non-distributed environment into components configured for use in a distributed environment. Moreover, in many cases, distributing a pipeline across the computing power of many machines can often times result in an increase in pipeline performance, despite the aggregate power of the distributed machines merely equaling that of the single machine.

Environment mapping system 100, in accordance with an embodiment of the invention, is illustrated by FIG. 1. In the example embodiment, environment mapping system 100 includes computing device 110, non-distributed environment 120, distributed environment 130, and server 140, all interconnected via network 108.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. In general, network 108 can be any combination of connections and protocols that will support communications between computing device 110, non-distributed environment 120, distributed environment 130, and server 140.

In the example embodiment, computing device 110 includes user interface 112. Computing device 110 may be a server, laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 4.

User interface 112 is a software application which allows a user of computing device 110 to interact with computing device 110 as well as other connected devices via network 108. User interface 112 may be connectively coupled to hardware components, such as those depicted by FIG. 4, for receiving user input, including mice, keyboards, touchscreens, microphones, cameras, and the like. In embodiments, user interface 112 may be implemented via a web browsing application containing a graphical user interface (GUI) that is capable of transferring data files, folders, audio, video, hyperlinks, compressed data, and other forms of data transfer individually or in bulk. Alternatively, user interface 112 may be implemented via other integrated or standalone software applications and hardware capable of receiving user interaction and communicating with other electronic devices.

Non-distributed environment 120 includes server 122. In the example embodiment, non-distributed environment 120 is an environment in which all data storage and processing are all performed on individual computing devices that do not collaboratively work together to perform one or more tasks.

Server 122 may be a server, laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While server 122 is shown as a single device, in other embodiments, server 122 may be comprised of a cluster or plurality of computing devices, working together or working separately. Server 122 is described in more detail with reference to FIG. 4.

Distributed environment 130 includes server 132, server 134, and server 136. In the example embodiment, distributed environment 130 is an environment in which data storage and processing is performed across two or more computing devices working collaboratively within a network to perform one or more tasks.

In the example embodiment, server 132, server 134, and server 136 may each be a server, laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. In the example embodiment, server 132, server 134, and server 136 are configured to communicate with one another such that data, programming, and processing may be shared amongst one another. While in the example embodiment distributed environment 130 includes server 132, server 134, and server 136, in other embodiments, distributed environment 130 may contain any number of two or more computing devices. Server 132, server 134, and server 136 are described in more detail with reference to FIG. 4.

In the example embodiment, non-distributed environment 120 has a computing power that is equal to that of distributed environment 130, i.e., server 122 has a computing power equal to that of the aggregate of server 132, server 134, and server 136. For example, server 122 may be a machine with 48 cores and 180 GB of storage while server 132, server 134, and server 136 may each have 16 cores and 60 GB of storage, respectively. In other embodiments, however, non-distributed environment 120 may have more or less computing power than that of distributed environment 130.

In the example embodiment, server 140 includes environment mapper 142 and may be a server, laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While server 140 is shown as a single device, in other embodiments, server 140 may be comprised of a cluster or plurality of computing devices, working together or working separately. Server 140 is described in more detail with reference to FIG. 4.

Environment mapper 142 is a software application capable of receiving a data pipeline configured for non-distributed environment 120 and identifying one or more bottleneck components of the data pipeline. In addition, environment mapper 142 is capable of converting data used in the non-distributed environment to a format compatible with distributed environment 130 and installing the computing libraries necessary for operating the pipeline within distributed environment 130. Environment mapper 142 is further capable of converting programming language, such as object code or source code, of the pipeline to programming language that is compatible with distributed environment 130 and optimizing components of the data pipeline for use in distributed environment 130.

Figure 2:
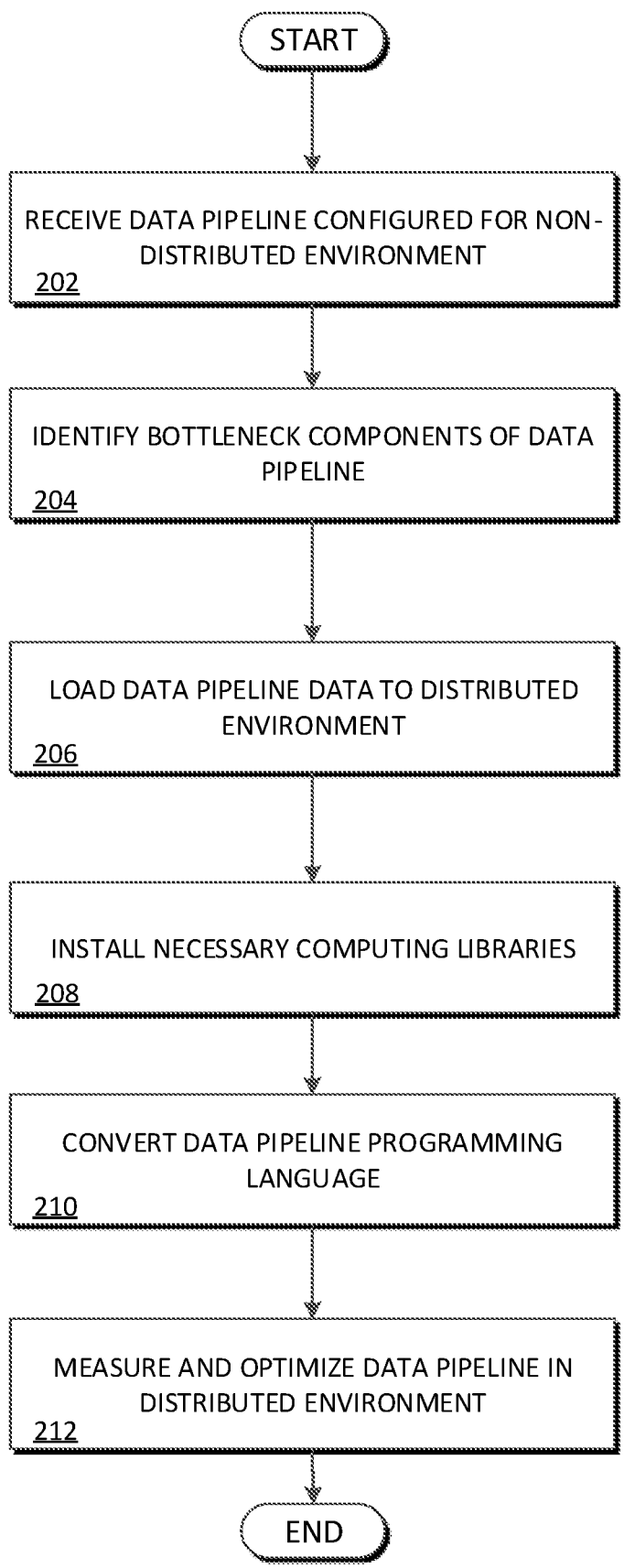
FIG. 2 depicts a flowchart illustrating the operations of the environment mapper 142 of environment mapping system 100 in mapping data pipeline components from a non-distributed environment to a distributed environment, in accordance with an embodiment of the present invention.

FIG. 2 illustrates the operations of environment mapper 142 of environment mapping system 100 in mapping components of a pipeline within a non-distributed environment to a distributed environment.

Environment mapper 142 receives a data pipeline configured for non-distributed environment 120 (step 202). In the example embodiment, environment mapper 142 is linked to non-distributed environment 120 in order to identify manners by which one or more components of the data pipeline may be mapped for use in distributed environment 130. In embodiments, for example, environment mapper 142 may be linked to non-distributed environment 120 via network 108 to remotely monitor performance of the components comprising the data pipeline. Alternatively, in another example, environment mapper may receive performance data, either past or in real time, for components of the data pipeline via network 108 for remote analysis. In a yet further example, environment mapper 142 may be incorporated into non-distributed environment 120 in order to locally analyse components of the data pipeline. According to the invention herein, such pipelines may be any sequence of functional components, modules, operations, etc., in which one component leads to the next, with each component configured for performing a particular operation. For example, components of a data pipeline may include data quality checks, data processing, model generation, model training, and the like. Moreover, it will be appreciated that the present invention may be applicable to data pipelines having any number of components or modules that are configured for operation in non-distributed environment 120.

Figure 3:
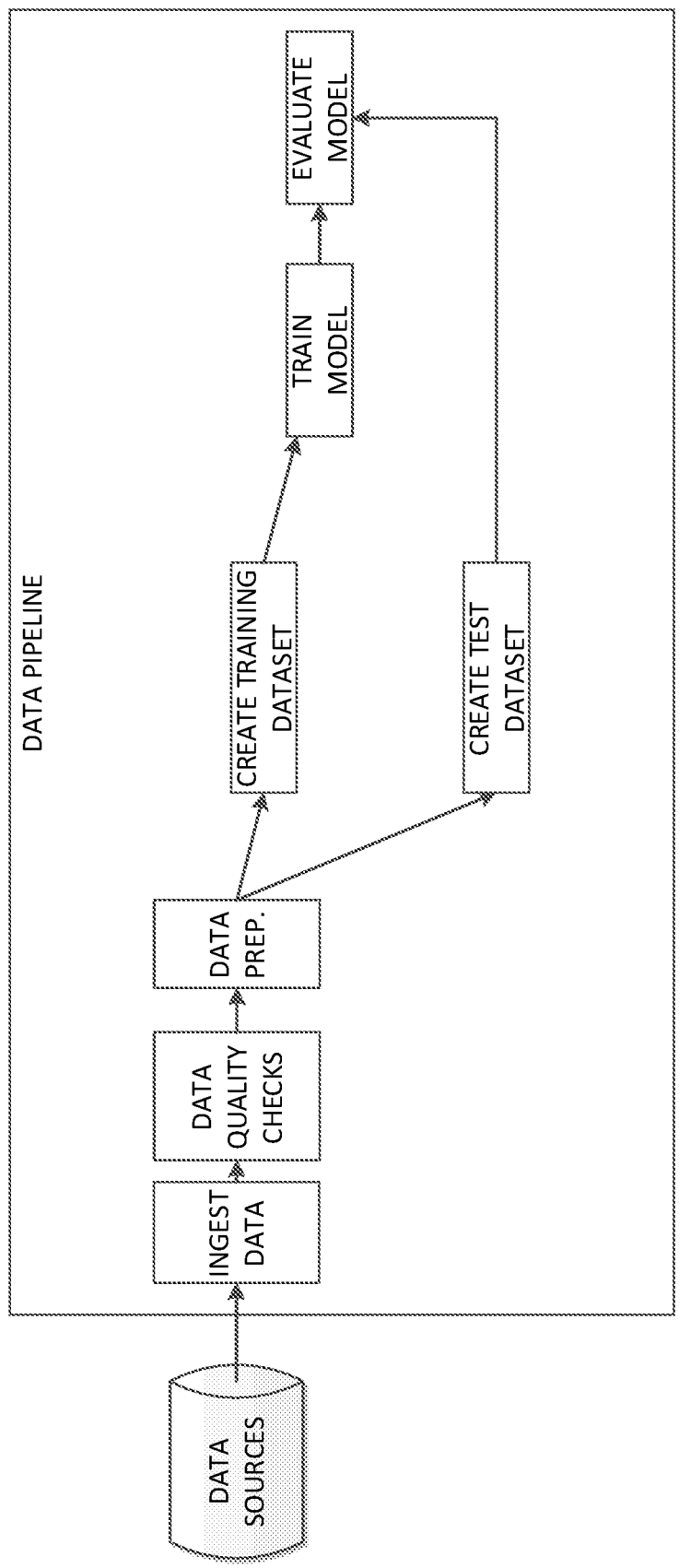
FIG. 3 depicts an example data pipeline, in accordance with an embodiment of the present invention.

With reference to an illustrative example depicted by FIG. 3, for instance, environment mapper 142 is linked via network 108 to a pipeline implemented within non-distributed environment 120 configured for generating and evaluating models that describe healthcare claims data. As depicted by FIG. 3, the data pipeline comprises the components ingest data, data quality checks, data preparation, create training dataset, create test dataset, train model, and evaluate model.

Referring now back to FIG. 2, environment mapper 142 identifies one or more bottleneck components in the received data pipeline of non-distributed environment 120 (step 204). In the example embodiment, bottleneck components are the components slowing, reducing, or otherwise impeding the pipeline from performing more efficiently. As described above, components are functional modules and environment mapper 142 identifies the one or more bottleneck components of the pipeline using absolute or relative thresholds of what is considered suboptimal performance for each component of the pipeline. In order to establish the thresholds that distinguish optimal performance from suboptimal performance, environment mapper 142 may be configured to reference previous measurements, receive user input thresholds, or a combination of analysis methods. For example, environment mapper 142 may be configured to periodically measure the performance of a particular component at a prescribed frequency and identify suboptimal performance based on threshold variations in the measurements as data is processed, for example based on a standard deviation. Alternatively, environment mapper 142 may be configured to analyse performance of a particular component across multiple datasets to determine whether the component responds to additional data, computations, increasing complexity, etc., as expected. For example, environment mapper 142 may vary data, e.g. double an amount, and determine whether a proportional variation is observed within the performance, e.g. double time to compute. If the results indicate a lesser performance than expected, e.g. three times as long to compute, then environment mapper 142 identifies the component as a bottleneck. In yet further embodiments, environment mapper 142 may be configured to identify suboptimal performance of a component by analysing data of the component within a distributed environment and comparing the observed performance to that of a similar component in a non-distributed environment. For example, the performance of a particular pipeline component implemented in non-distributed environment 120 may be compared to that of a similar pipeline component being implemented in distributed environment 130.

The aforementioned methods, as well as many others, can be performed using several approaches, including a memory driven approach, a performance driven approach, and a hybrid approach, all described below (step 204 continued). In the following approaches, it should be noted that absolute and relative thresholds can be specific to each individual component, groups of components, or generic to the entire data pipeline. In addition, in some embodiments, duration thresholds may be further associated with each threshold such that brief spikes in measurements do not result in false positives. For example, environment mapper 142 may require a measurement exceed a threshold for one minute or longer in order to trigger identification of a bottleneck component.

In order to identify bottleneck components using a memory driven approach (step 204 continued), environment mapper 142 uses tools such as top command and other memory commands to identify which components are taking a longest time to perform a task. Top command displays processor and memory activity for running processes that can be analysed to determine which components are performing sub-optimally based on absolute or relative thresholds. In the example above, for instance, environment mapper 142 may set an absolute processor use threshold of 70% for any component of the pipeline, indicating that components utilizing 70% or more of the processor when implemented within non-distributed environment 120 are to be considered a bottleneck in the pipeline. Similarly, environment mapper 142 may receive an absolute processor use threshold of 50K (50 kilobytes) when implemented within non-distributed environment 120, indicating that a component is a bottleneck if processor use exceeds 50K. Alternatively, in another example, environment mapper 142 may determine processor use for all components of the pipeline and identify the component have a relatively highest processor use as a bottleneck, for example by comparing the one or more components and designating the component taxing the processor the most as the bottleneck. In a similar example, environment mapper 142 may be further configured to only identify a component having a highest processor use as a bottleneck if the use exceeds a second highest or average processor use of the remaining components by a specific threshold. To that point, environment mapper 142 may be configured to identify components having a highest processing use as bottleneck only if the use exceeds the next highest processor using component, or average of all remaining components, by 20%. As previously mentioned, thresholds for each component may be configured for each particular component as well as groups of components. In some embodiments, a threshold can be associated with the entire data pipeline, with performance in excess of the threshold indicating that all components of the data pipeline are bottlenecks requiring remapping.

In order to identify bottleneck components using performance driven identification (step 204 continued), environment mapper 142 utilizes system timing commands to identify statistics describing how long various functions take to perform. In some embodiments, environment mapper 142 may utilize profiling tools to establish a profile of each component that provides a set of statistics describing how often and for how long various components are taking at a per system call/line/function/module level. In the example above, for instance, environment mapper 142 may receive a one-hour time threshold applicable to every component in the pipeline, indicating that if any particular component exceeds an hour in time to complete a task, the component is identified as a bottleneck. Alternatively, and using a relative threshold, environment mapper 142 may be configured to identify any component which takes double an amount of time as the shortest duration component in the pipeline as being bottleneck components. In addition, environment mapper 142 may be configured for determining components operating more frequently than an absolute or relative threshold value, for example a component utilizing processing power more than five times per hour or more than double a frequency of a next highest component. In general, environment mapper 142 may utilize and analyse various metrics, for example combining both frequency and duration of operations performed by a component, in order to identify bottlenecks.

In some embodiments (step 204 continued), environment mapper 142 may identify bottleneck components using a hybrid approach of both memory and performance driven identification. In such embodiments, environment mapper 142 may set thresholds through parameters for each component to complete a task. Such thresholds may include a maximum memory available for a component within the pipeline and/or a maximum acceptable time for completion of a component within the data pipeline. Moreover, environment mapper 142 may further automate experiments that identify an optimal memory and time that can be met by the system with the constraints provided. For example, if a specific memory usage is allotted to a particular component to ensure other resources in the environment have ample memory access, a maximum memory threshold may be provided as a constraint on that component. Alternatively, if a fixed time threshold is crucial, e.g. no more than 2 hours for a component to complete its function, then a time threshold for that component or pipeline may be provided. In embodiments where both memory and time are important, they can both be provided as parameters. If this threshold is fixed and well defined, the environment mapper can encode the logic and automatically identify bottleneck components.

It is important to note that another consideration in determining bottlenecks is an effectiveness of distributing the component within distributed environment 130. For instance, components which can make use of parallel processing, such as learners utilizing iterative algorithms that require intermediate storage, are more suitable for translation to a distributed environment than components which are incapable or have no need for parallelization, such as data preparation. Thus, although environment mapper 142 may identify some components as bottlenecks, the components may not be the most suitable candidate for mapping to a configuration compatible with distributed environment 130. Accordingly, in some embodiments, a user may be prompted after identification of the bottleneck components to affirmatively select one or more components to map. In such embodiments, the components may be ranked based on lowest relative performance and listed in descending order for a user to select via user interface 112. In further embodiments, environment mapper 142 may recall previously component mappings and results to indicate which components of those identified as bottleneck components map better to distributed environment 130 based on past experience, and continuously improve component suggestions as more data is accumulated. In yet further embodiments, environment mapper 142 may autonomously determine which components to map to distributed environment 130 based on a combination of those components identified as bottlenecks above, translatability of the bottleneck components to distributed environment 130, and analysis of previously mapped components. It should be noted that the present invention is not limited to mapping only a single bottleneck component to distributed environment 130, and in some cases may even identify every component of the data pipeline as a bottleneck.

Continuing the example illustrated by FIG. 3 having components ingest data, data quality checks, data preparation, create training dataset, create test dataset, train model, and evaluate model, environment mapper 142 performs a performance based and memory driven analysis to determine that the data preparation and train model components are bottlenecks. Moreover, environment mapper 142 additionally considers that the train model component, unlike the data preparation component, utilizes logistic regression which benefits from usage of parallel in-memory data processing. By contrast, the data preparation component may have functions that are highly dependent on the results of prior quality checks, hence the availability of a higher degree of parallelization wouldn't benefit the data preparation component much. Thus, considering both performance and memory based analysis, as well as translatability of the components, environment mapper 142 identifies the train model component as the most suitable bottleneck component for mapping to distributed environment 130. Note that in some embodiments, both the data preparation and train model components may be mapped to distributed environment 130 through, for example, user preferences, manual override, etc.

Having identified bottleneck components of non-distributed environment 120, environment mapper 142 loads data of non-distributed environment 120 into distributed environment 130 (step 206). In embodiments, the data used in the pipeline when implemented in non-distributed environment 120 must be modified for use in distributed environment 130 because the data had previously only been configured for access by a single device. In distributed environment 130, the data must be modified such that multiple computing devices may access and make use of it, often times simultaneously. Accordingly, when applicable, environment mapper 142 is configured to replicate the data across multiple storage sites in order to make the data more accessible to additional computing devices within distributed environment 130, such as server 132, server 134, and server 136. Moreover, storing the data across multiple computing devices provides backup mechanisms in the case a storage node is destroyed, gets corrupted, loses power, etc. In addition, because moving from a non-distributed environment to a distributed environment often times requires programming and functionality not generally included in a pipeline implemented within a non-distributed environment, loading the data into distributed environment 130 may further comprise environment mapper 142 converting the data to a format compatible with the desired architecture of distributed environment 130.

In the example introduced above and depicted by FIG. 3, for instance, where train model has been identified as a bottleneck component, environment mapper 142 replicates the health claims data from server 122 of non-distributed environment 120 across server 132, server 134, and server 136 of distributed environment 130. In addition, environment mapper 142 further converts the health claims data from a relational database to a file on disk.

Environment mapper 142 installs necessary computing libraries for operation of the bottleneck component(s) within distributed environment 130 (step 208). As mentioned above, different distributed environment architectures may call for different file types, formats, and other compatibility necessities in order to function properly. Similarly, different architectures may further require, or simply benefit from, integrated libraries which contain a collection of precompiled data, such as routines and reference resources, that a component or pipeline can use. Libraries are advantageous for storing frequently used routines and data because they do not need to be explicitly linked to every component or pipeline that uses them. Rather, architectures have integrated libraries, from which the routines and data may be called by pipelines and components thereof utilizing the architecture. Such libraries may include data such as configuration data, documentation, etc., while routines may include pre-written code and subroutines for performing various operations. In the example embodiment, environment mapper 142 installs the necessary libraries for the particular architecture of distributed environment 130 on at least one computing device of distributed environment 130 (e.g. server 134). In other embodiments, however, environment mapper 142 may install the libraries on multiple or all the computing devices of distributed environment 130 (e.g. server 132, server 134, and server 136).

With reference again to the example above, environment mapper 142 installs libraries corresponding to the desired architecture of distributed environment 130, which include configuration data and subroutines for data quality checks.

Environment mapper 142 converts programming language corresponding to one or more components of the pipeline to programming language that is suitable for the architecture of distributed environment 130 (step 210). Like the data format and libraries described above which are specific to an architecture, as may be a programming language for each architecture type. When the programming language of the bottleneck component(s), or of other components within the data pipeline, differs from that of the architecture for distributed environment 130, environment mapper 142 may need modify the programming language of the components. In some embodiments, only programming language of the bottleneck component being mapped to distributed environment 130 need be modified. In embodiments, environment mapper 142 may be configured to convert the coding of the bottleneck component in entirety to conform with that of distributed environment 130. In other embodiments, environment mapper 142 may be capable of adapting the bottleneck component to distributed environment 130 using other means, for example through use of a wrapper function. A wrapper function is a subroutine whose main purpose is to call a second subroutine. In the present invention, a wrapper function may be written to adapt the native programming language of the bottleneck component to that of distributed environment 130. Thus, rather than modifying the entirety native code used by the component itself, environment mapper 142 simply generates a wrapper function suitable for translating the two programming languages. While this method and others may be practical in adapting some programming languages to others, it may not be suitable in all situations and thus, in some embodiments, environment mapper 142 converts the programming language of all components of the pipeline to that of distributed environment 130. In some embodiments, environment mapper 142 may be configured to first determine whether the programming language of the one or more bottleneck components are compatible with the desired architecture of distributed environment 130 and, if not, determine whether a wrapper function can reconcile the inconsistent programming languages. Then, only if environment mapper 142 is incapable of either/both modifying the programming language of only the bottleneck component(s) or generating a file wrapper for the bottleneck component(s) does environment mapper 142 convert the programming language of components comprising the whole pipeline to that of distributed environment 130.

In the example introduced earlier, for example, in which the train model component was identified as a bottleneck, environment mapper 142 converts the programming language for the component into that which is suitable for use with the desired architecture for distributed environment 130. Alternatively, environment mapper 142 generates a wrapper function for the component train model that is suitable for the desired architecture of distributed environment 130.

Environment mapper 142 measures and optimizes the components of the pipeline when implemented within distributed environment 130 (step 212). In the example embodiment, environment mapper 142 utilizes performance measuring tools to determine a performance of the mapped components and pipeline as a whole when implemented in distributed environment 130. For example, environment mapper 142 may compare performance of the distributed pipeline and/or bottleneck component(s) to that measured when previously determining which components of the non-distributed pipeline are bottlenecks. Alternatively, environment mapper 142 may compare performance of the distributed pipeline and/or bottleneck components to that of known benchmarks, for example comparable pipelines/components, or to anticipated results. In the example embodiment, such measurements are recorded and later used in evaluating the effectiveness of the mapping. For example, environment mapper 142 may record which and how components of the pipeline are mapped to distributed environment 130, as well as a corresponding change in performance of the component(s) and pipeline as a whole. These records may then be utilized as a resource in future mappings, for example in determining which bottleneck component to map, how many bottleneck components to map, whether mapping is practical/feasible, whether to use a wrapper function, which programming language yields best results for a particular architecture, which libraries to install, and other considerations made by environment mapper 142. Such insights may be extracted from the recorded data using known data analysis techniques and future insights may be extracted using cognitive learning techniques and artificial intelligence. In addition, environment mapper 142 may further optimize the pipeline and components thereof where possible by using in-memory data process when applicable, for example in machine learning algorithms. Such optimization techniques similarly be recorded and used in determining a most effective means for future component mappings.

Consider the pipeline of the example pipeline introduced above, for instance, where the train model component has been mapped to distributed environment 130. Environment mapper 142 measures the performance of the train model component and pipeline as a whole and compares it to the measured performances prior to the mapping, as well as expected performance. Environment mapper 142 records the performance data, for example a 20% increase in overall pipeline efficiency, and utilizes the data in future mappings in determining which components are most suitable for translation. If, for example, environment mapper 142 previously recorded that for a similar pipeline mapping evaluate model to distributed environment 130 resulted in a 30% increase in overall pipeline efficiency, environment mapper 142 may alternatively map the evaluate model component, or both, in future mappings.

FIG. 3 depicts an example data pipeline comprising the components ingest data, data quality checks, data preparation, create training dataset, create test dataset, train model, and evaluate model.

Based on the foregoing, a computer system, method, and computer program product have been disclosed. However, numerous modifications and substitutions can be made without deviating from the scope of the present invention. Therefore, the present invention has been disclosed by way of example and not limitation.

Figure 4:
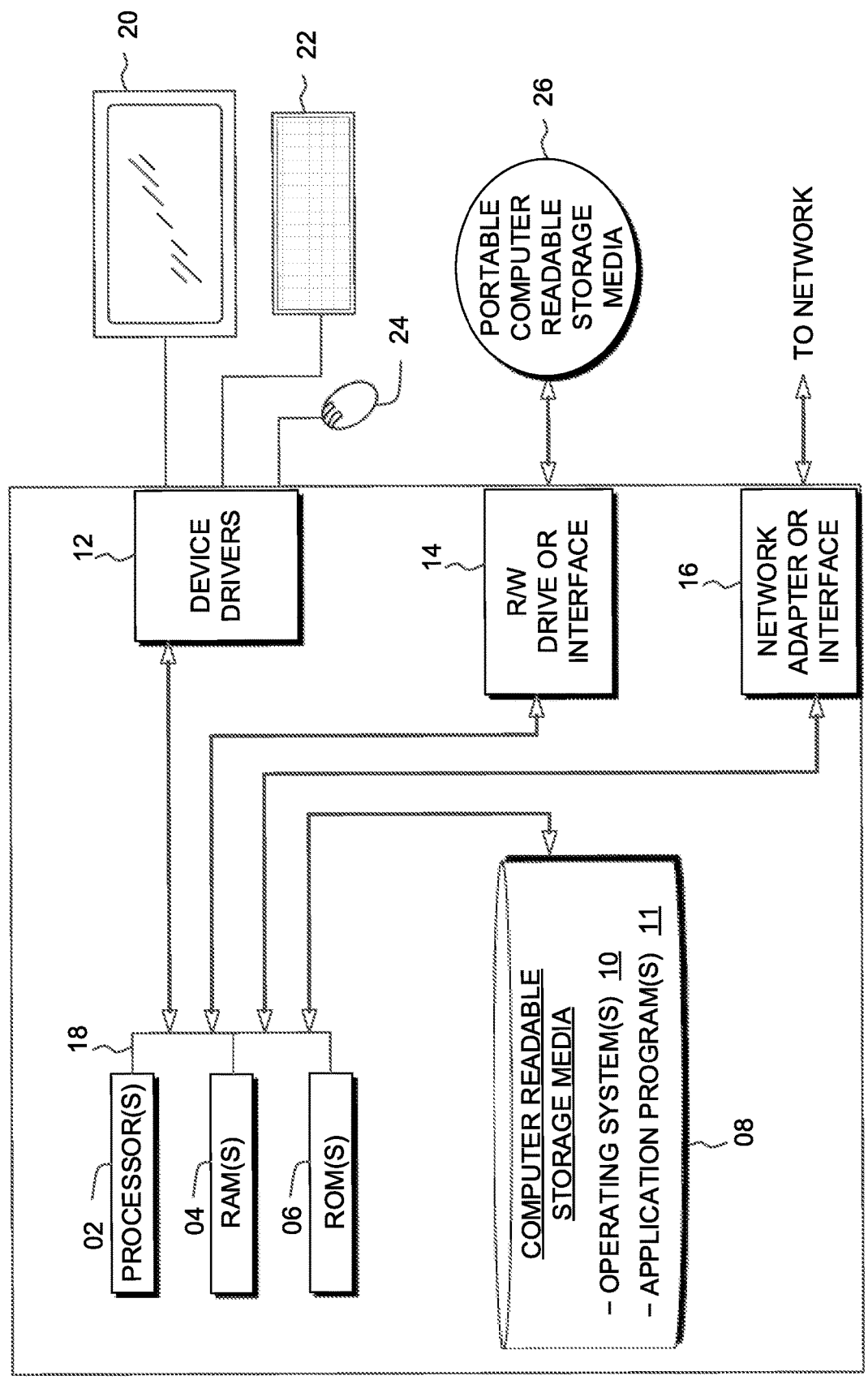
FIG. 4 depicts a block diagram depicting the hardware components of environment mapping system 100 of FIG. 1, in accordance with an embodiment of the present invention.

FIG. 4 depicts a block diagram of computing device 110 of environment mapping system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example environment mapper 142, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
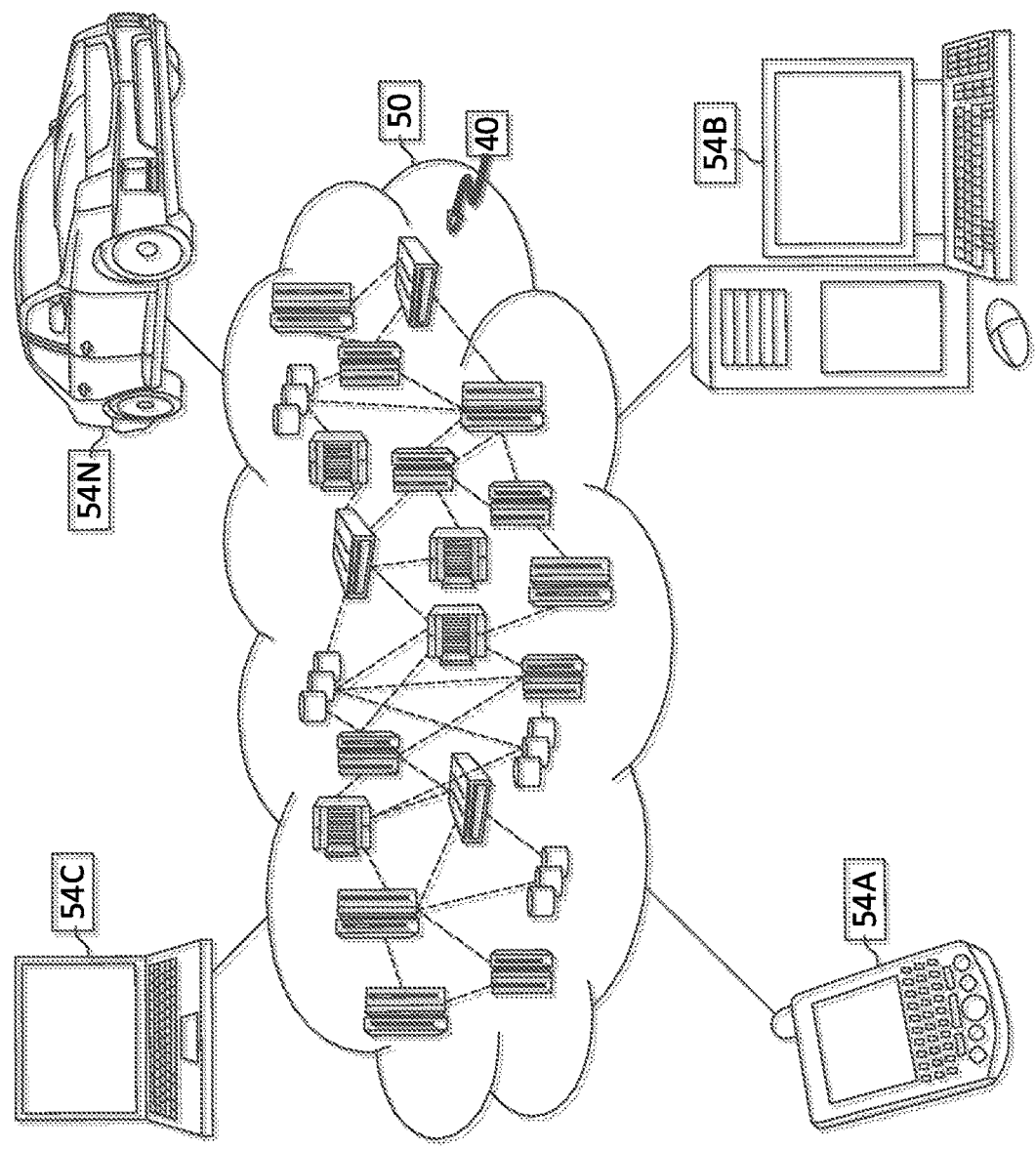
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
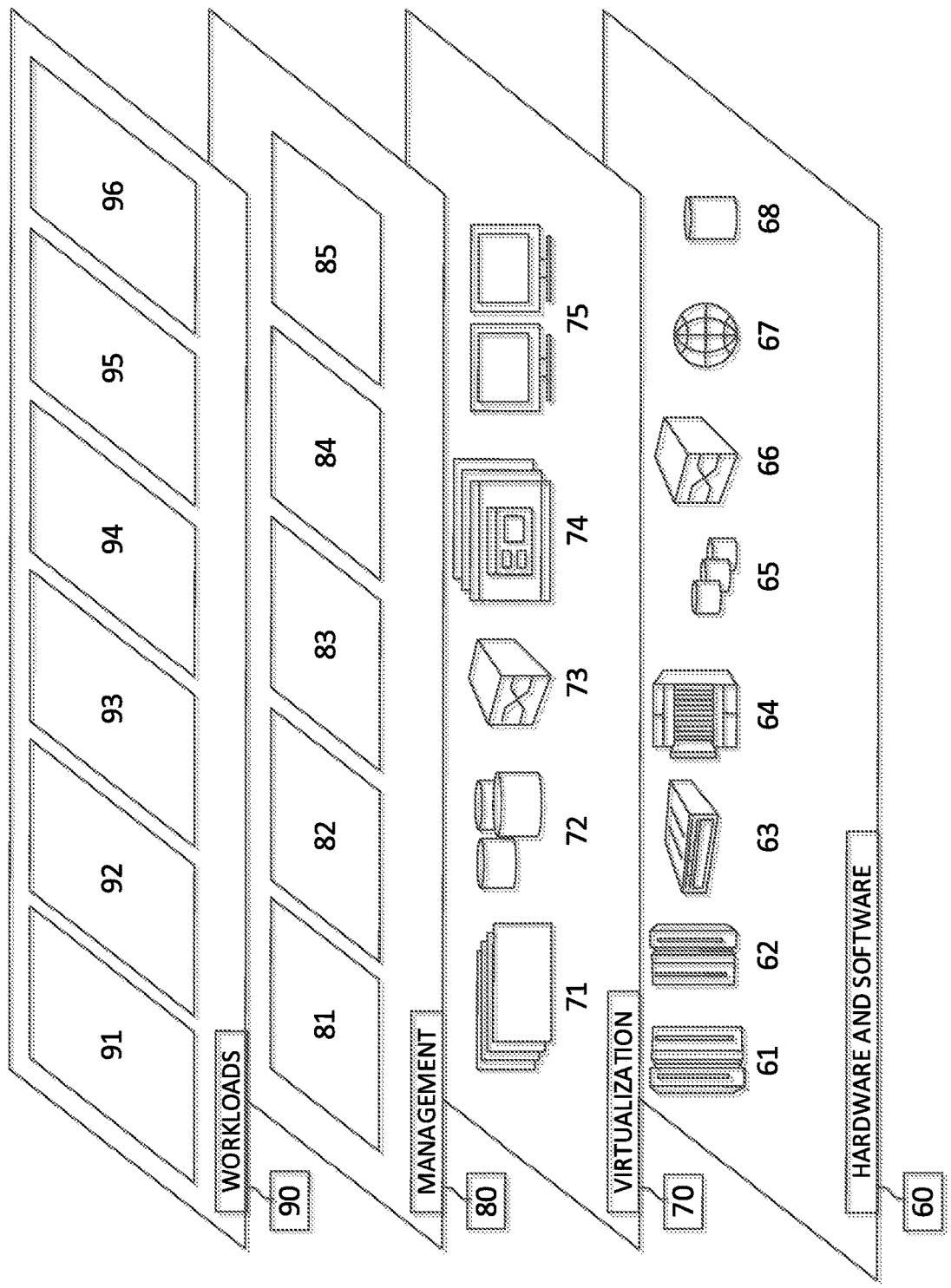
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mapping processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for mapping one or more components of a data pipeline from a non-distributed computing environment to a distributed computing environment, the method comprising:

a computer identifying at least one bottleneck component of one or more components comprising the data pipeline when implemented within the non-distributed computing environment, wherein identifying the at least one bottleneck component is based on a hybrid approach, wherein the hybrid approach sets thresholds through parameters for each component to complete a task, and further comprises:
    increasing an input to the one or more components comprising the data pipeline;
    determining that a performance of the at least one component is less than proportional to the increase of the input;
the computer converting data corresponding to the at least one bottleneck component from a format compatible with the non-distributed computing environment to a format compatible with the distributed computing environment;
the computer installing libraries corresponding to an architecture of the distributed computing environment; and
the computer converting code of the at least one bottleneck component from a format compatible with the non-distributed computing environment to a format compatible with the distributed computing environment.

2. The method of claim 1, further comprising:
the computer measuring a performance of the at least one bottleneck component when implemented within the distributed computing environment; and
wherein identifying the at least one bottleneck component of one or more components comprising the data pipeline is further based on the measured performance of the at least one bottleneck.

3. The method of claim 2, further comprising:
the computer determining whether the at least one bottleneck component is capable of being parallelized; and
wherein identifying the at least one bottleneck component of one or more components comprising the data pipeline is further based on determining that the at least one bottleneck component is capable of being parallelized.

4. The method of claim 1, wherein identifying the at least one bottleneck component further comprises at least one of:
the computer identifying at least one component of the one or more components having a greatest memory usage; and
the computer identifying at least one component of the one or more components having a memory usage exceeding a threshold value.

5. The method of claim 1, wherein identifying the at least one bottleneck component further comprises at least one of:
the computer identifying at least one component of the one or more components taking a longest time to complete a task; and
the computer identifying at least one component of the one or more components taking longer than a threshold time to complete a task.

6. The method of claim 1, wherein identifying the at least one bottleneck component further comprises:
the computer generating a model for operating the data pipeline having one or more parameters and one or more constraints, wherein the one or more parameters include memory usage and time;
the computer determining a lowest memory usage and shortest time based on the model; and
the computer identifying at least one component of the one or more components that fails to perform at the lowest memory usage or the shortest time.

7. The method of claim 1, wherein converting code of the at least one bottleneck further comprises:
the computer determining that code of the at least one bottleneck component is incompatible with code of the non-distributed computing environment; and
the computer generating a wrapper function enabling compatibility between code of the at least one bottleneck component and code of the non-distributed computing environment.

8. A computer program product for mapping one or more components of a data pipeline from a non-distributed computing environment to a distributed computing environment, the computer program product comprising:
one or more computer-readable storage devices and program instructions stored on at least one of the one or more tangible storage devices, the program instructions comprising:
program instructions to identify at least one bottleneck component of one or more components comprising the data pipeline when implemented within the non-distributed computing environment, wherein identifying the at least one bottleneck component is based on a hybrid approach, wherein the hybrid approach sets thresholds through parameters for each component to complete a task;
    program instructions to increase an input to the one or more components comprising the data pipeline;
    program instructions to determine that a performance of the at least one component is less than proportional to the increase of the input;
program instructions to convert data corresponding to the at least one bottleneck component from a format compatible with the non-distributed computing environment to a format compatible with the distributed computing environment;
program instructions to install libraries corresponding to an architecture of the distributed computing environment; and
program instructions to convert code of the at least one bottleneck component from a format compatible with the non-distributed computing environment to a format compatible with the distributed computing environment.

9. The computer program product of claim 8, further comprising:
program instructions to measure a performance of the at least one bottleneck component when implemented within the distributed computing environment; and
wherein identifying the at least one bottleneck component of one or more components comprising the data pipeline is further based on the measured performance of the at least one bottleneck.

10. The computer program product of claim 9, further comprising:
program instructions to determine whether the at least one bottleneck component is capable of being parallelized; and
wherein identifying the at least one bottleneck component of one or more components comprising the data pipeline is further based on determining that the at least one bottleneck component is capable of being parallelized.

11. The computer program product of claim 8, wherein program instructions to identify the at least one bottleneck component further comprise at least one of:

program instructions to identify at least one component of the one or more components having a greatest memory usage; and program instructions to identify at least one component of the one or more components having a memory usage exceeding a threshold value.

12. The computer program product of claim 8, wherein program instructions to identify the at least one bottleneck component further comprise at least one of:

program instructions to identify at least one component of the one or more components taking a longest time to complete a task; and program instructions to identify at least one component of the one or more components taking longer than a threshold time to complete a task.

13. The computer program product of claim 8, wherein program instructions to identify the at least one bottleneck component further comprise:

program instructions to generate a model for operating the data pipeline having one or more parameters and one or more constraints, wherein the one or more parameters include memory usage and time;

program instructions to determine a lowest memory usage and shortest time based on the model; and program instructions to identify at least one component of the one or more components that fails to perform at the lowest memory usage or the shortest time.

14. The computer program product of claim 8, wherein program instructions to convert code of the at least one bottleneck further comprise:

program instructions to determine that code of the at least one bottleneck component is incompatible with code of the non-distributed computing environment; and program instructions to generate a wrapper function enabling compatibility between code of the at least one bottleneck component and code of the non-distributed computing environment.

15. A computer system for mapping one or more components of a data pipeline from a non-distributed computing environment to a distributed computing environment, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to identify at least one bottleneck component of one or more components comprising the data pipeline when implemented within the non-distributed computing environment, wherein identifying the at least one bottleneck component is based on a hybrid approach, wherein the hybrid approach sets thresholds through parameters for each component to complete a task;

program instructions to increase an input to the one or more components comprising the data pipeline;

program instructions to determine that a performance of the at least one component is less than proportional to the increase of the input;

program instructions to convert data corresponding to the at least one bottleneck component from a format compatible with the non-distributed computing environment to a format compatible with the distributed computing environment;

program instructions to install libraries corresponding to an architecture of the distributed computing environment; and program instructions to convert code of the at least one bottleneck component from a format compatible with the non-distributed computing environment to a format compatible with the distributed computing environment.

16. The computer system of claim 15, further comprising:

program instructions to measure a performance of the at least one bottleneck component when implemented within the distributed computing environment; and wherein identifying the at least one bottleneck component of one or more components comprising the data pipeline is further based on the measured performance of the at least one bottleneck.

17. The computer system of claim 16, further comprising:

program instructions to determine whether the at least one bottleneck component is capable of being parallelized; and wherein identifying the at least one bottleneck component of one or more components comprising the data pipeline is further based on determining that the at least one bottleneck component is capable of being parallelized.

18. The computer system of claim 15, wherein program instructions to identify the at least one bottleneck component further comprise at least one of:

program instructions to identify at least one component of the one or more components having a greatest memory usage; and program instructions to identify at least one component of the one or more components having a memory usage exceeding a threshold value.

19. The computer system of claim 15, wherein program instructions to identify the at least one bottleneck component further comprise at least one of:

program instructions to identify at least one component of the one or more components taking a longest time to complete a task; and program instructions to identify at least one component of the one or more components taking longer than a threshold time to complete a task.

20. The computer system of claim 15, wherein program instructions to identify the at least one bottleneck component further comprise:

program instructions to generate a model for operating the data pipeline having one or more parameters and one or more constraints, wherein the one or more parameters include memory usage and time;

program instructions to determine a lowest memory usage and shortest time based on the model; and program instructions to identify at least one component of the one or more components that fails to perform at the lowest memory usage or the shortest time.

* * * * *